United States Patent Office 3,124,563
Patented Mar. 10, 1964

3,124,563
POLYMERIZATION OF ETHYLENE WITH ALUMINUM HYDROCARBON ALLYLIC METAL ALCOHOLATE CATALYSTS
George Robert McKay, Jr., and Emory Menefee, Wilmington, Del., assignors to E. I. du Pont de Nemours and Company, Wilmington, Del., a corporation of Delaware
No Drawing. Filed June 20, 1957, Ser. No. 667,019
6 Claims. (Cl. 260—94.9)

The present invention relates to the polymerization of ethylene employing an organometallic catalyst and more particularly to the polymerization of ethylene with an organometallic catalyst to produce copolymers of ethylene.

One of the recent developments in the field of ethylene polymerization is the discovery of an organometallic catalyst capable of polymerizing ethylene to high molecular weight polymers at atmospheric pressures and room temperatures. The polyethylene obtained by this catalyst system is a "linear" or "high density" polyethylene as contrasted to the heretofore commercially available "low density" or "branched" polyethylene. These two polymers of ethylene vary significantly in their physical properties such as melting point, stiffness, toughness, tensile strength, impermeability, etc. The differences in physical properties result primarily from a structural difference in the polymer chain. As the naming of these polyethylenes already indicates, linear polyethylenes have less methyl-ended side chains than branched polyethylenes. As shown in Canadian Patent 502,597, these linear polymers of ethylene have less than one side chain per two hundred carbon atoms in the polymer chain. As a result the linear polyethylenes possess a higher degree of crystallinity which is shown by their higher density. Thus linear polyethylenes have densities of 0.94 to 0.97 g./ccm. whereas branched polyethylenes have densities of 0.92 to 0.935 g./ccm. Organometallic catalysts capable of polymerizing ethylene to such "linear" polyethylenes have been disclosed, for instance, in Belgian Patent 533,362 issued to Karl Ziegler, which discloses the formation of an active ethylene polymerization catalyst when a transition metal compound such as a titanium halide is admixed with an aluminum trialkyl. However, the same inventor discloses in the Belgian Patent 540,136 that if a titanate or zirconate such as tetrabutyl titanate or tetrabutyl zirconate is reacted with an aluminum trialkyl, a catalyst is obtained which will polymerize ethylene to butene, hexene and other volatile homologs of butene.

In accordance with the present invention, ethylene is polymerized to a high molecular weight ethylene/α-olefin copolymer when contacted with a catalyst formed by reacting an allylic alcoholate of a group IV–B and V–B metal with an aluminum hydrocarbon compound.

The allylic alcoholates of group IV–B and V–B metals employed in the present invention are allylic alcoholates of titanium, zirconium, hafnium, thorium, vanadium, niobium and tantalum. These transition metals are listed as group V–B and IV–B of the periodic table of elements as illustrated on page 392 of the 37th edition of the "Handbook of Chemistry and Physics," published by the Chemical Rubber Publishing Company. The preferred allylic alcoholates are those of titanium and vanadium which are also referred to as titanates and vanadates. The alcoholates employed in the formation of the catalysts of the present invention contain the allyl structure

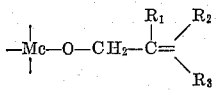

wherein $R_1$, $R_2$ and $R_3$ may be either a hydrogen or a hydrocarbon radical.

Examples of the allylic metal alcoholates employed in the present invention are:

Allyl titanate
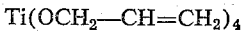

Methallyl titanate
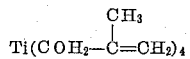

Benzyl titanate
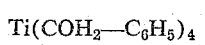

Cinnamyl titanate
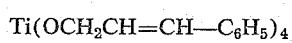

Benzhydryl titanate
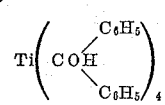

Geranyl titanate
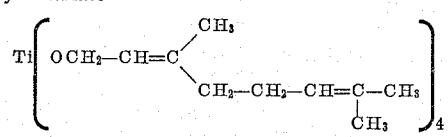

Vanadyl alloxide
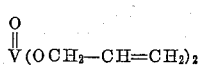

Methallyl vanadate
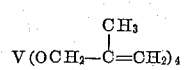

The allylic alcoholates are readily prepared through an exchange reaction of a saturated metal alcoholate such as tetraisopropyl titanate with the allylic alcohol.

The second component employed in the preparation of the catalyst is an aluminum trialkyl or triaryl such as aluminum triisobutyl, aluminum triethyl, aluminum triphenyl, etc. These aluminum trihydrocarbon compounds have the general formula $AlR_3$, wherein R is a hydrocarbon radical. Various methods known in the art may be employed in the preparation of aluminum alkyls either from the metal or the metal hydride by reaction with a suitable alkyl halide or α-olefin.

The catalyst is formed by admixing the two components. Preferably the catalyst ingredients are admixed in the form of solutions in inert solvents, or added to inert solvents, which can further be employed as polymerization media. Such inert solvents are hydrocarbon solvents which are liquid at the polymerization temperatures; preferred solvents are aromatic and saturated aliphatic or cycloaliphatic hydrocarbons such as benzene, xylene, cyclohexane, heptane, etc. Admixing the catalyst ingredients in a solvent will give rise to a more finely dispersed catalyst which has greater catalytic activity. The formation of the catalytically active species is almost instantaneous and thus it is possible to form the catalyst in the presence of the monomer to be polymerized. Although the catalytically active species has not been completely identified it is believed that the aluminum trialkyl causes the reduction of the transition metal to a catalytically active valence state. The quantity of aluminum trialkyl added to the transition metal compound may be greatly varied; however, it is generally preferred to employ a molar ratio of aluminum alkyl to transition metal compound varying from 0.5 to 10; a particularly preferred range of ratios is from 1 to 2.

The products obtained by the process of the present invention are surprisingly different than would be expected from the prior art. From the teachings of the Belgian Patent 540,136 it would be expected that allylic metal alcoholates would behave similarly as saturated alcoholates and thus cause the formation of low molecular weight, volatile polymers of ethylene such as butenes, hexenes, etc. If at all different, one skilled in the art might expect the formation of linear polyethylenes, as are obtained when transition metal salts are reacted with aluminum alkyls and then employed in the polymerization of ethylene. However, contrary to these surmisable results, it was discovered that the polymers obtained with the above-described catalysts are branched polymers of ethylene having more than one methyl-ended side chain per two hundred carbon atoms. They further vary from the commercial branched polymers with respect to their density, which falls within that of linear polyethylenes, and their exceedingly high molecular weight. Although no definite explanation has been as yet found for this unusual behavior, it is believed that the catalysts of the present invention serve a double function. They cause the formation of butenes and other $\alpha$-olefins as has been determined by the analysis of the excess monomer gases remaining after polymerization. They further cause the polymerization of ethylene to high molecular weight, and due to the presence of the $\alpha$-olefin actually are believed to result in the formation of ethylene $\alpha$-olefin copolymers, which explains the high number of methyl-ended side chains measured by infra-red analysis of the polymer.

The polymerization of ethylene with the catalysts of the present invention is carried out according to procedures employed for the polymerization of ethylene with organometallic catalysts derived from transition metal compounds as known in the art. Thus temperatures from room temperature to 300° C. may be employed. Pressures may be varied from atmospheric pressure to pressures above 1000 atmospheres. The polymerization is preferably carried out in an inert hydrocarbon solvent. The concentration of the catalyst is immaterial as long as an excess of ethylene is available for polymerization, i.e., as long as the ethylene pressure is maintained during polymerization. In batch operations where no additional ethylene is supplied to the reaction zone, the concentration of the catalyst may vary from 0.001 to 10% by weight of the monomer. The reaction is preferably carried out in the absence of moisture and hydroxyl groups containing compounds since the catalysts are decomposed and inactivated by an excess amount of such a compound.

It was discovered that the degree of branching or the degree of copolymerization is to a certain extent dependent on the reaction temperature. Thus, if it is desired to prepare a more highly branched polymer, a higher reaction temperature is generally employed.

The process of the present invention is further illustrated by the following examples, demonstrating the polymerization of ethylene with the catalysts described above. The examples, however, are not intended to limit the scope of the present invention.

*Example I*

Into a 330 cc. stainless steel autoclave was charged 200 ml. heptane, 0.005 mole of allyl and 0.02 mole of aluminum triisobutyl. The reactor was heated to 150–158° C. and ethylene was injected until a pressure of 775 atmospheres was obtained. The reaction mixture was agitated for 1.5 hours while maintaining pressure and temperature. On cooling and filtering the reaction mixture there was obtained 15.5 g. of a solid polymer. The polymer was found to have a density of 0.941 and on infrared analysis was shown to contain 2.4 methyl groups per 100 carbon atoms.

*Example II*

Into a creased reaction flask heated by an oil bath and equipped with stirrer, reflux condenser and gas inlets and outlets was charged under nitrogen 25 ml. of decahydronaphthalene. The contents were then agitated, heated to 50° C. and the nitrogen was replaced with ethylene at atmospheric pressure. After a saturated solution had been obtained, 300 micromoles of cinnamyl titanate and 1000 micromoles of aluminum triisobutyl was injected into the reaction mixture. In 400 minutes, 600 cc. of ethylene was adsorbed and polymerized which on precipitation with methanol, filtration, washing and drying gave rise to 0.35 g. of polymer corresponding to a 48% yield.

*Example III*

Employing the procedure disclosed in Example II, ethylene was polymerized employing 600 micromoles of methallyl titanate and 2 millimoles of aluminum triisobutyl. After 80 minutes, 373 cc. of ethylene was polymerized giving rise to 0.15 g. of polymer corresponding to a 32% yield.

*Example IV*

Employing the procedure disclosed in Example II, ethylene was polymerized employing 600 micromoles of geranyl titanate and 2000 micromoles of aluminum triisobutyl. After 110 minutes, 832 cc. of ethylene was polymerized giving rise to 0.186 g. of polymer corresponding to a yield of 18%.

*Example V*

Into a 330 ml. stainless steel autoclave was charged under nitrogen 150 ml. of decahydronaphthalene, 2 millimoles of vanadyl alloxide and 5 millimoles of aluminum triisobutyl. The reaction mixture was heated to 75° C. and the nitrogen was replaced with ethylene until a pressure of 68 atmospheres was obtained. Polymerization was continued at that temperature and pressure for 1 hour while the reaction mixture was agitated. The resulting polymer was precipitated from the reaction mixture by the addition of methanol, on filtering, washing and drying, 13.8 g. of polymer was obtained. The polymer could be molded into tough films but showed no appreciable melt flow.

*Example VI*

Into a 330 ml. stainless steel autoclave was charged under nitrogen 100 ml. of heptane. The reactor was charged with ethylene and heated until a pressure of 400 atmospheres and a temperature of 180° C. was obtained. To 50 ml. of heptene was added 0.005 mole of allyl titanate and 0.02 mole of aluminum triisobutyl. This catalyst mixture was then injected into the autoclave and polymerization was continued for 2.5 hours with agitation while maintaining temperature and pressure. The resulting polymer was precipitated from the reaction mixture by addition of methanol. On filtering, washing with methanol and butanol, and vacuum drying, 10 g. of solid polyethylene was obtained. The polymer was found to contain 3.9 methyl groups per 100 carbon atoms.

The above examples have illustrated the formation of branched polyethylenes believed to be copolymers of ethylene and $\alpha$-olefins employing the process of the present invention. The branched polymers obtained by the process of the present invention may be employed as molding compositions in the fabrication of solid and hollow articles, as extruding compositions in the preparation of film and sheeting, or as coating compositions in the coating of wire and other surfaces. The polymeric products may be blended with stabilizing agents, pigments, foaming agents or various other additives to obtain desirable properties.

We claim:
1. A process for polymerizing ethylene which comprises contacting ethylene with a catalyst formed by the reaction of an aluminum trihydrocarbon compound with an allylic metal alcoholate, wherein the metal is a transition metal of group IV and V of the periodic table of elements, in a molar ratio varying from 0.5 to 10.

2. A process for polymerizing ethylene which comprises contacting ethylene in the presence of an inert hydrocarbon solvent with a catalyst formed by the reaction of an aluminum trialkyl with an allylic metal alcoholate having the general formula

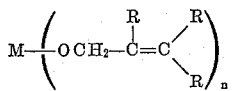

wherein M is a transition metal selected from group IV and V of the periodic table of elements, R is a member of the class consisting of hydrogen and hydrocarbon radicals and $n$ is at least one and not greater than the valence state of said metal, in a molar ratio varying from 0.5 to 10.

3. A process for polymerizing ethylene which comprises contacting ethylene at a temperature of 25 to 300° C. with a catalyst in an inert liquid hydrocarbon solvent, said catalyst consisting of the product formed by reacting an allylic metal alcoholate having the general formula:

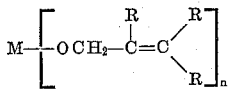

wherein M is a transition metal selected from group IV–B and V–B of the periodic table of elements, R is a member of the class consisting of hydrogen and hydrocarbon radicals and $n$ is at least one and not greater than the valence state of said metal, with an aluminum trialkyl, the molar ratio of said aluminum trialkyl to said metal alcoholate varying from 0.5 to 10.

4. The process as set forth in claim 3 wherein the aluminum trialkyl is aluminum triisobutyl.

5. The process as set forth in claim 4 wherein the metal alcoholate is allyl titanate.

6. A polymerization catalyst comprising the reaction product formed by the reaction of an aluminum trihydrocarbon with an allylic metal alcoholate, wherein the metal is a transition metal of group IV and V of the periodic table of elements, in a molar ratio varying from 0.5 to 10.

References Cited in the file of this patent

UNITED STATES PATENTS

| | | |
|---|---|---|
| 2,684,972 | Haslam | July 27, 1954 |
| 2,833,755 | Coover | May 6, 1958 |
| 2,846,427 | Findlay | Aug. 5, 1958 |
| 2,886,561 | Reynolds et al. | May 12, 1959 |
| 2,905,645 | Anderson et al. | Sept. 22, 1959 |

FOREIGN PATENTS

| | | |
|---|---|---|
| 533,362 | Belgium | May 16, 1955 |
| 540,136 | Belgium | Jan. 31, 1955 |
| 218,210 | Australia | Nov. 3, 1958 |